US010897369B2

(12) United States Patent
Harpur et al.

(10) Patent No.: US 10,897,369 B2
(45) Date of Patent: Jan. 19, 2021

(54) GUIDING A PRESENTER IN A COLLABORATIVE SESSION ON WORD CHOICE (71) Applicant: INTERNATIONAL BUSINESS MACHINES CORPORATION, Armonk, NY (US)

(72) Inventors: Liam Harpur, Skerries (IE); Ruthie D. Lyle, Durham, NC (US); Patrick J. O'Sullivan, Ballsbridge (IE); Lin Sun, Morrisville, NC (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 0 days.

(21) Appl. No.: 13/657,025

(22) Filed: Oct. 22, 2012

(65) Prior Publication Data
US 2014/0115065 A1 Apr. 24, 2014

(51) Int. Cl.
H04L 12/18 (2006.01)

(52) U.S. Cl.
CPC .............. H04L 12/1822 (2013.01)

(58) Field of Classification Search
CPC ... G06F 15/16; H04L 12/1822; H04L 65/403; H04M 3/567
USPC .......................................... 709/205; 715/753
See application file for complete search history.

(56) References Cited

U.S. PATENT DOCUMENTS

| | | | | |
|---|---|---|---|---|
| 5,437,555 A * | 8/1995 | Ziv-El | ...................... | G09B 5/14 379/102.02 |
| 6,346,952 B1 * | 2/2002 | Shtivelman | .................... | 715/758 |
| 7,454,460 B2 * | 11/2008 | Ivashin | ......................... | 709/203 |
| 7,467,947 B2 * | 12/2008 | Sperle | ...................... | G09B 5/00 434/322 |
| 7,475,340 B2 * | 1/2009 | Bodin | .................. | G06F 17/218 707/E17.009 |
| 7,493,556 B2 * | 2/2009 | Bodin | .................... | G06Q 10/10 715/203 |
| 7,680,820 B2 * | 3/2010 | Denoue | .................. | G06Q 10/10 707/608 |
| 7,698,360 B2 * | 4/2010 | Rowley | .................... | G09B 5/12 709/203 |
| 7,707,249 B2 * | 4/2010 | Spataro et al. | ............... | 709/205 |
| 7,765,257 B2 * | 7/2010 | Chen | ..................... | H04L 67/306 709/204 |

(Continued)

OTHER PUBLICATIONS

"Ginger Proofreader" [online] Ginger Software [retrieved Oct. 11, 2012] retrieved from the Internet: <http://www.gingersoftware.com/>, 2 pgs.

(Continued)

Primary Examiner — Vivek Srivastava
Assistant Examiner — Binod J Kunwar
(74) Attorney, Agent, or Firm — Cuenot, Forsythe & Kim, LLC (57) ABSTRACT Suggesting words includes, during a collaborative session involving a plurality of participants, determining a first subject domain of interest for at least one participant of the collaborative session that is not a presenter and selecting, using a processor, at least one word within the first subject domain. The word can be provided to a communication device of the participant designated as the presenter and not to any other communication device of a participant.

20 Claims, 4 Drawing Sheets (56) References Cited

U.S. PATENT DOCUMENTS

| | | | | |
|---|---|---|---|---|
| 8,117,262 B2* | 2/2012 | Kumar et al. | | 709/205 |
| 8,121,269 B1* | 2/2012 | Hession | | H04L 12/18 379/93.01 |
| 8,185,828 B2* | 5/2012 | Liu | | G06Q 10/10 715/753 |
| 8,200,758 B2* | 6/2012 | Serr | | G06F 15/16 370/335 |
| 8,250,141 B2* | 8/2012 | Xiao et al. | | 709/204 |
| 8,271,574 B1* | 9/2012 | Srinivasan | | G06Q 10/101 709/201 |
| 8,400,489 B2* | 3/2013 | Le Goff | | G10L 15/1822 348/14.07 |
| 8,510,399 B1* | 8/2013 | Byttow | | G06Q 10/10 707/770 |
| 8,539,027 B1* | 9/2013 | Chen | | G06Q 50/01 709/202 |
| 8,589,806 B1* | 11/2013 | Sena | | H04M 7/0027 715/753 |
| 8,699,939 B2* | 4/2014 | German | | G06Q 10/10 434/322 |
| 8,731,454 B2* | 5/2014 | Dohring | | G09B 5/00 434/350 |
| 8,843,832 B2* | 9/2014 | Frields | | G06F 9/542 715/756 |
| 8,886,797 B2* | 11/2014 | Gannu | | H04L 67/22 709/224 |
| 9,031,839 B2* | 5/2015 | Thorsen | | G10L 15/183 704/235 |
| 2003/0197729 A1 | 10/2003 | Denoue et al. | | |
| 2005/0222890 A1* | 10/2005 | Cheng | | G06Q 10/109 705/7.19 |
| 2006/0026231 A1* | 2/2006 | Degenhardt | | G06Q 10/10 709/204 |
| 2006/0080432 A1* | 4/2006 | Spataro | | H04L 12/1831 709/224 |
| 2006/0105313 A1* | 5/2006 | Mansfield | | G09B 7/00 434/350 |
| 2007/0130276 A1* | 6/2007 | Zhang | | G06Q 10/107 709/207 |
| 2007/0253424 A1* | 11/2007 | Herot | | H04L 12/1818 370/395.2 |
| 2008/0091686 A1* | 4/2008 | Beard | | G06Q 10/10 |
| 2008/0126953 A1* | 5/2008 | Davidson | | G06Q 10/10 715/753 |
| 2009/0192845 A1* | 7/2009 | Gudipaty | | G06Q 10/10 705/7.19 |
| 2010/0188475 A1* | 7/2010 | Le Goff | | G10L 15/1822 348/14.08 |
| 2010/0192072 A1* | 7/2010 | Spataro | | H04L 65/403 715/753 |
| 2010/0228777 A1* | 9/2010 | Imig | | G06F 16/335 707/772 |
| 2011/0231780 A1* | 9/2011 | Ayloo | | G06Q 10/10 715/753 |
| 2011/0264745 A1* | 10/2011 | Ferlitsch | | G06Q 10/109 709/205 |
| 2011/0314105 A1* | 12/2011 | Chen | | G06Q 10/103 709/205 |
| 2012/0005588 A1* | 1/2012 | Bastide et al. | | 715/741 |
| 2012/0110196 A1* | 5/2012 | Balasaygun | | G06Q 10/10 709/228 |
| 2012/0144319 A1* | 6/2012 | Tan | | G06Q 10/103 715/753 |
| 2012/0159353 A1* | 6/2012 | Beerse | | G06Q 10/101 715/756 |
| 2012/0179980 A1* | 7/2012 | Whalin | | G06Q 10/10 715/753 |
| 2012/0179981 A1* | 7/2012 | Whalin | | H04W 4/21 715/753 |
| 2012/0224021 A1* | 9/2012 | Begeja | | H04N 7/147 348/14.08 |
| 2013/0018967 A1* | 1/2013 | Gannu | | G06F 16/9574 709/206 |
| 2013/0080460 A1* | 3/2013 | Tomko | | G06F 17/30864 707/767 |
| 2013/0227425 A1* | 8/2013 | Kim | | H04W 4/023 715/740 |
| 2013/0325972 A1* | 12/2013 | Boston | | G06K 9/00751 709/206 |
| 2014/0149505 A1* | 5/2014 | Christiansen | | 709/204 |

OTHER PUBLICATIONS

"Choose how spelling and grammar checking work—Visio—Office.com" [online] Microsoft Corporation [retrieved Sep. 18 12] retrieved from the Internet: <office.microsoft.com/en-us/.../choose-how-spelling-and-grammar-checking-work-HP010119467.aspx>, 6 pgs.

* cited by examiner

GUIDING A PRESENTER IN A COLLABORATIVE SESSION ON WORD CHOICE

BACKGROUND

Maintaining the attention of an audience while speaking can be difficult. Such is the case for both the skilled and unskilled speaker. Despite the best of intentions, one or more listeners are likely to lose focus at some point during the presentation. When the attention of a listener drifts away from the speaker, the information that the speaker is attempting to convey is lost on that individual. Further, opportunities for collaboration between the listener and other members of the audience and/or the speaker are diminished or entirely lost. The likelihood of the listener contributing to the meeting is also reduced. The inability of a speaker to maintain the attention of an audience, when considered over time, can result in a loss of productivity and effectiveness for an organization.

BRIEF SUMMARY

A method for suggesting words includes, during a collaborative session involving a plurality of participants, determining a first subject domain of interest for at least one participant of the collaborative session that is not a presenter and selecting, using a processor, at least one word from the first subject domain. The method further includes providing the word to a communication device of the participant designated as the presenter and not to any other communication device of a participant.

A system for suggesting words includes a processor programmed to initiate executable operations. The executable operations include, during a collaborative session involving a plurality of participants, determining a first subject domain of interest for at least one participant of the collaborative session that is not a presenter and selecting at least one word from the first subject domain. The executable operations further include providing the word to a communication device of the participant designated as the presenter and not to any other communication device of a participant.

A computer program product for suggesting words includes a computer readable storage medium having program code embodied therewith. The program code is executable by a processor to perform a method including, during a collaborative session involving a plurality of participants, determining a first subject domain of interest for at least one participant of the collaborative session that is not a presenter using the processor, selecting, using the processor, at least one word from the first subject domain, and providing, using the processor, the word to a communication device of the participant designated as the presenter and not to any other communication device of a participant.

DETAILED DESCRIPTION

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer-readable medium(s) having computer-readable program code embodied, e.g., stored, thereon.

Any combination of one or more computer-readable medium(s) may be utilized. The computer-readable medium may be a computer-readable signal medium or a computer-readable storage medium. A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk drive (HDD), a solid state drive (SSD), a random access memory (RAM), a read-only memory (ROM), an erasable programmable read-only memory (EPROM or Flash memory), an optical fiber, a portable compact disc read-only memory (CD-ROM), a digital versatile disc (DVD), an optical storage device, a magnetic storage device, or any suitable combination of the foregoing. In the context of this document, a computer-readable storage medium may be any tangible, e.g., non-transitory, medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device.

Program code embodied on a computer-readable medium may be transmitted using any appropriate medium, including but not limited to wireless, wireline, optical fiber, cable, RF, etc., or any suitable combination of the foregoing. Computer program code for carrying out operations for aspects of the present invention may be written in any combination of one or more programming languages, including an object oriented programming language such as Java™, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer, or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer, other programmable data processing apparatus, or other devices create means for implementing the functions/acts specified in the flowchart and/or block diagram block or blocks.

These computer program instructions may also be stored in a computer-readable medium that can direct a computer, other programmable data processing apparatus, or other devices to function in a particular manner, such that the instructions stored in the computer-readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

One or more embodiments disclosed within this specification relate to providing guidance as to word choice to a presenter within a collaborative session. In accordance with the inventive arrangements disclosed within this specification, one or more subject domains of interest to participants in the collaborative session can be determined. One or more words from the one or more of the subject domains of interest are selected and provided to a presenter within the collaborative session. The presenter receives the words and is able to incorporate the words within the presentation. By using, e.g., speaking, words from the selected subject domain to the participants, the likelihood that participants in the collaborative session remain focused and attentive on the presenter is increased.

For purposes of simplicity and clarity of illustration, elements shown in the figures have not necessarily been drawn to scale. For example, the dimensions of some of the elements may be exaggerated relative to other elements for clarity. Further, where considered appropriate, reference numbers are repeated among the figures to indicate corresponding, analogous, or like features.

Figure 1:
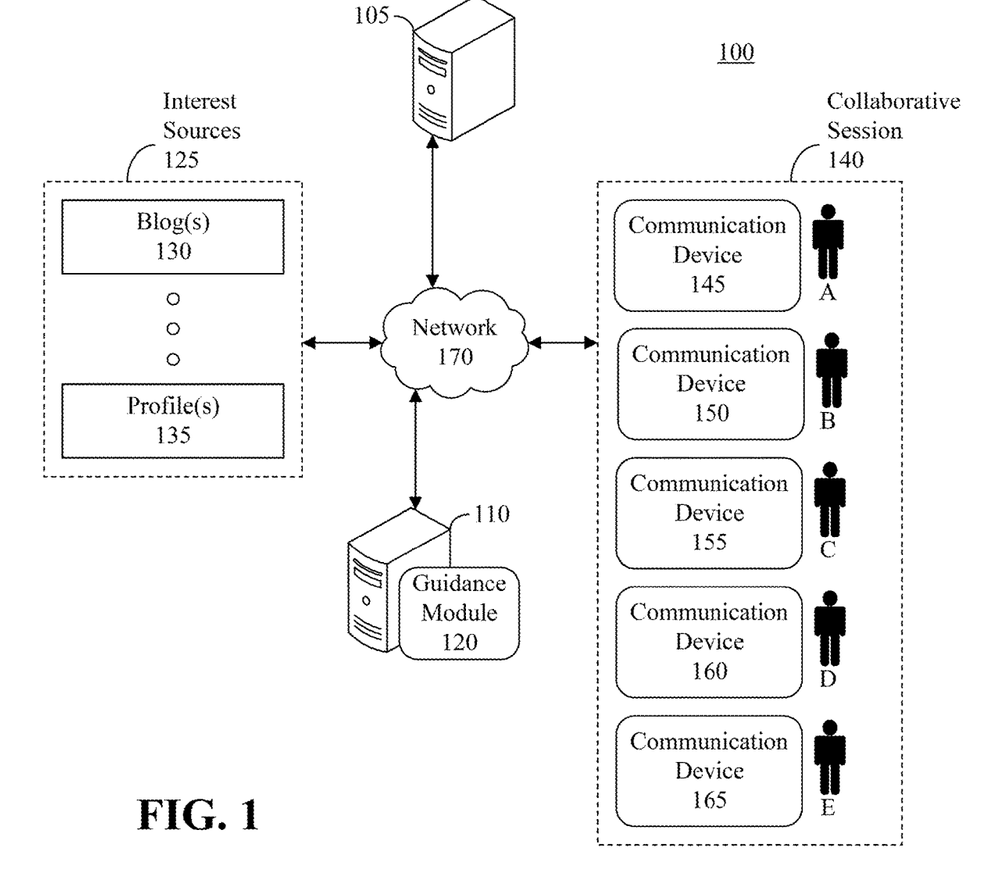
FIG. 1 is a block diagram illustrating an example of a communication system.

FIG. 1 is a block diagram illustrating an example of a communication system 100. Communication system 100 includes a collaboration system 105, a word guidance system (guidance system) 110, one or more interest sources 125, and a plurality of communication devices 145-165 communicatively linked through a network 170. Network 170 can be implemented as, or include, any of a variety of different networks such as a WAN, a LAN, a wireless network, a mobile network, a Virtual Private Network (VPN), the Internet, a Public Switched Telephone Network (PSTN), or the like.

In one aspect, collaboration system 105 is implemented as a data processing system, e.g., a server, executing suitable operational and/or application software. Collaboration system 105 implements one or more collaborative sessions, such as collaborative session 140, of which communication devices 145-165 are participants. A "collaborative session," as used herein, refers to a communication session in which a two or more users participate and communicate with one another concurrently through appropriate communication devices. Examples of a collaborative session include, but are not limited to, a conference call, a screen cast, a Web-meeting, or the like. Typically, within the collaborative session, one of the participants is designated as a presenter.

In some cases, collaboration system 105 is implemented as a data processing system. In other cases, collaboration system 105 is implemented as specialized hardware or a combination of specialized hardware operating in cooperation with a data processing system. For example, in the case where collaborative session 140 is a conference call conducted over the PSTN, collaboration system 105 can include or be implemented as, a telephony switch. The telephony switch can operate in place of, or in cooperation with, a data processing system. Depending upon the type of collaborative session 140, collaboration system 105 can be implemented in any of a variety of forms using any of a variety of specialized hardware.

Each of users A, B, C, D, and E is taking part in collaborative session 140 through a respective one of communication devices 145-165. User A corresponds to communication device 145. User B corresponds to communication device 150. User C corresponds to communication device 155. User D corresponds to communication device 160. User E corresponds to communication device 165.

Communication devices 145-165 represent any of a variety of different communication devices such as mobile communication devices (e.g., smart phones, Internet-enabled phones, tablet devices, etc.), computers, or other information processing or communication appliances. Appreciably, the particular type of communication device used by a user will vary according to the type of collaborative session 140.

From time-to-time within this specification, reference to a communication device, such as any of communication devices 145-165, may also refer to the particular user of that communication device. A "user" refers to a human being that operates or uses a particular communication device. Similarly, reference to a user may also refer to the communication device utilized by that user. For example, reference to user A can refer to communication device 145. Similarly, reference to communication device 145 can refer to user A or an identity maintained by user A on communication device 145. In illustration, a shared artifact within a collaborative session can be made available from user A to user B is understood to mean that the artifact is made available from communication device 145 to communication device 150. Further, in reference to a collaborative session, the term "participant" and the term "presenter" each refers to a user, or communication device of the user, that is taking part in, or has joined, collaborative session 140.

A presenter is a participant of collaborative session 140 that is designated, e.g., by collaboration system 105, as the presenter. A presenter typically has one or more rights and/or privileges that are not possessed by other participants of collaborative session 140 that are not designated as presenter. For purposes of discussion, user A is a presenter. Referring to the example of FIG. 1, user A has an ability to share content from communication device 145, e.g., screen share or share a presentation to be viewed by users B-E within collaborative session 140. Speech of the user A, as the presenter, is provided to users B-E. In some cases, other participants, e.g., users B, C, D, and/or E, may speak or obtain permission to speak to one or more or all other participants, but are not considered presenters as that term confers a particular status upon a participant within collaboration system 105 and, more particularly, within collaborative session 140.

Guidance system 110 is implemented as a data processing system, e.g., a server, executing suitable operational software and a guidance module 120. Guidance system 110 is configured to interact with collaboration system 105 to determine one or more subject domains of interest to one or more of the participants B-E of collaborative session 140. A "subject domain" refers to an area or department of knowledge or learning. Subject domains can be ordered with respect to one another. For example, subject domains can be classified into a structured relationship and/or hierarchy.

In one aspect, guidance system 105 determines subject domains that are of interest to participants of collaborative session 140 by accessing one or more interest sources 125. Examples of interest sources 125 include, but are not limited to, blogs 130 belonging to a participant, user profiles 135 (e.g., company user profiles specifying areas of expertise, interests, etc.) of participants, social network Websites to which participants belong or publish data, or the like.

Having determined subject domains of interest for one or more of users B-E, guidance system 110 selects one or more words from one or more of the subject domains. Guidance system 110 provides the selected word or words to communication device 145. The word or words that are selected can be presented or displayed to the presenter, i.e., user A, through communication device 145. Having the word or words generated by guidance system 110, the presenter can choose to utilize the word or words, e.g., speak the word or words, during the collaborative session to raise the level of interest and/or attentiveness of users B-E that have an interest in the particular subject domain from which the word or words were selected.

In another example, guidance system 110 selects words in view of the current subject domain of collaborative session 140, which can be determined prior to the start of collaborative session 140 or in real time as collaborative session 140 continues. As used herein, the phrase "real time" means a level of processing responsiveness that a user or system senses as sufficiently immediate for a particular process or determination to be made, or that enables the processor to keep up with some external process. As an illustrative example, the word or words selected by guidance system 110 may be common to both a selected subject domain of interest for at least one participant and the subject domain of the collaborative session.

Figure 2:
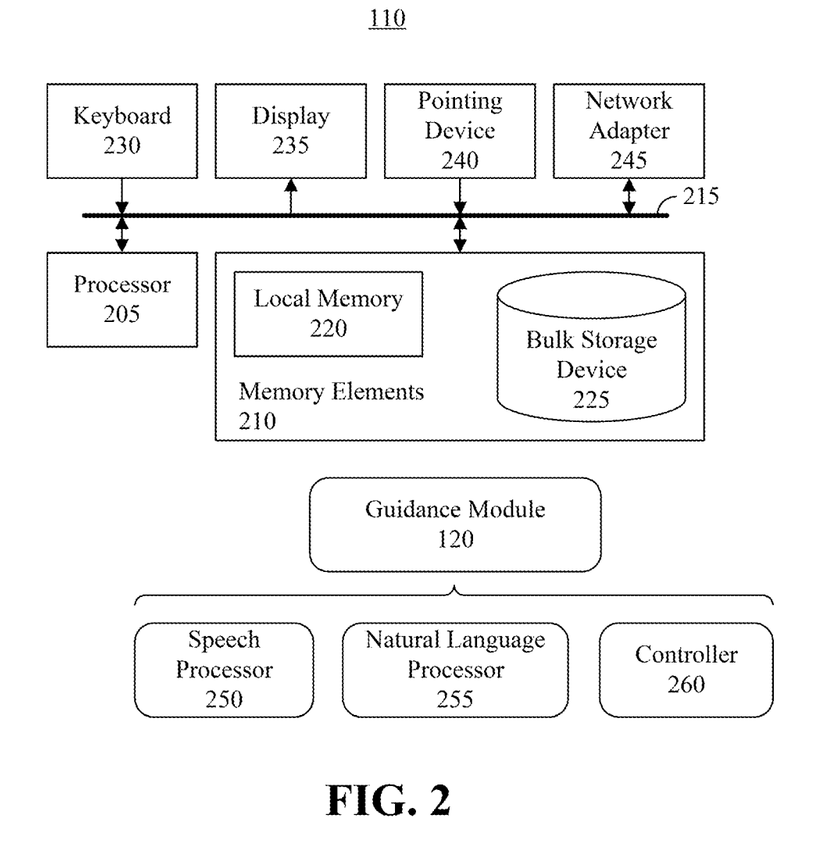
FIG. 2 is a block diagram illustrating an exemplary implementation of a guidance system as shown in FIG. 1.

FIG. 2 is a block diagram illustrating an exemplary implementation of guidance system 110 of FIG. 1. Guidance system 110 includes at least one processor 205, e.g., a central processing unit (CPU), coupled to memory elements 210 through a system bus 215 or other suitable circuitry. As such, guidance system 110 stores program code within memory elements 210. Processor 205 executes the program code accessed from memory elements 210 via system bus 215. In one aspect, for example, guidance system 110 can be implemented as a computer or a programmable data processing apparatus that is suitable for storing and/or executing program code. It should be appreciated, however, that guidance system 110 can be implemented in the form of any system including a processor and memory that is capable of performing the functions and/or operations described within this specification.

Memory elements 210 can include one or more physical memory devices such as, for example, local memory 220 and one or more bulk storage devices 225. Local memory 220 refers to RAM or other non-persistent memory device(s) generally used during actual execution of the program code. Bulk storage device(s) 225 can be implemented as a hard disk drive (HDD), solid state drive (SSD), or other persistent data storage device. Guidance system 110 also can include one or more cache memories (not shown) that provide temporary storage of at least some program code in order to reduce the number of times program code must be retrieved from bulk storage device 225 during execution.

Input/output (I/O) devices such as a keyboard 230, a display 235, and a pointing device 240 optionally can be coupled to guidance system 110. The I/O devices can be coupled to guidance system 110 either directly or through intervening I/O controllers. One or more network adapters 245 also can be coupled to guidance system 110 to enable guidance system 110 to become coupled to other systems, computer systems, remote printers, and/or remote storage devices through intervening private or public networks. Modems, cable modems, and Ethernet cards are examples of different types of network adapters 245 that can be used with guidance system 110.

Memory elements 210 can store operational software such as an operating system (not shown) in addition to guidance module 120. The operational software and guidance module 120, being implemented in the form of program code, are executed by guidance system 110 and, as such, are considered an integrated part of guidance system 110.

In one aspect, guidance module 120 optionally includes a plurality of components such as a speech processor 250, a natural language processor (NLP) 255, and a controller 260. The operational software, guidance module 120, and any components included therein, e.g., speech processor 250, NLP 255, and controller 260, as well as any other data relied upon in performing the functions described herein are functional data structures that impart functionality when employed as part of the system of FIG. 2.

Speech processor 250 converts speech in the form of digital audio into text for analysis. NLP 255 is configured to perform any of a variety of known NLP functions. Examples of NLP functions that can be performed include, but are not limited to, automatic summarization, co-reference resolution, discourse analysis, named entity recognition, part-of-speech tagging, keyword spotting, relationship extraction, sentiment analysis, topic segmentation (e.g., subject domain segmentation), or the like.

Controller 260 coordinates operation of speech processor 250 and NLP 255. Controller 260 is also configured to interact with collaboration system 105 to determine the participants and presenter of a collaborative session. In addition, controller 260 is configured to interact with communication device 145, for example, to deliver word usage, e.g., selected word(s), to the presenter of collaborative session 140.

Under control of controller 260, for example, speech processor 250 can be applied to audio channels of a collaborative session to generate text that is provided to NLP 255 to determine a current subject domain of the collaborative session. Through controller 260, for example, text from interest sources can be provided to NLP 255 for analysis to determine subject domains of interest for the participants of the collaborative session.

It should be appreciated that while FIG. 2 is described with reference to guidance system 110, the architecture illustrated in FIG. 2 can be utilized to implement one or more other devices such as, for example, collaboration system 105 and one or more of communication devices 145-165. Each such device can include operational software (e.g., an operating system) and suitable application software, whether a communication client such as a browser or another type of client software or server side software executing therein as appropriate.

Figure 3:
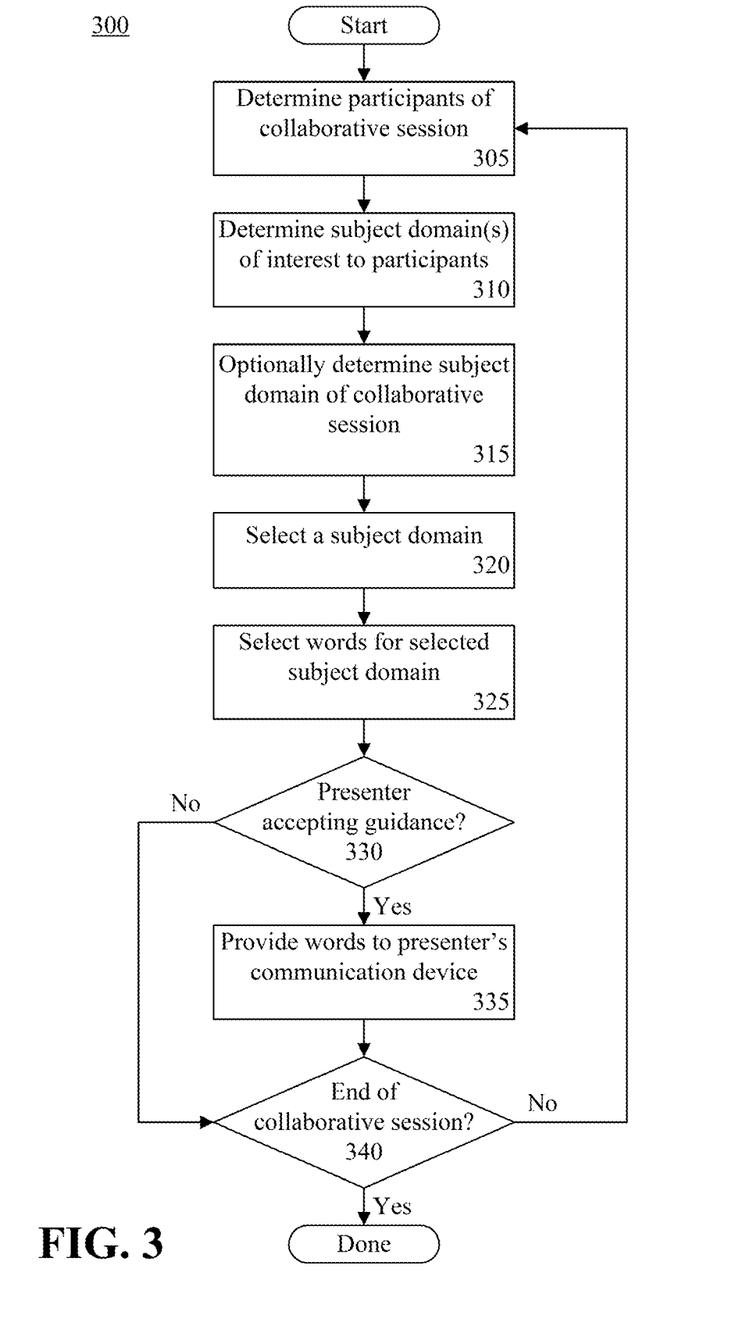
FIG. 3 is a flow chart illustrating an exemplary method of suggesting words to a presenter within a collaborative session.

FIG. 3 is a flow chart illustrating an exemplary method 300 of suggesting words to a presenter within a collaborative session. Method 300 is performed by a system such as the guidance system described within this specification with reference to FIGS. 1 and 2. The guidance system functions in a communication (and computing) environment as illustrated with reference to FIG. 1. For purposes of discussion, method 300 begins in a state in which a collaborative session has started. The collaborative session includes a plurality of participants and one participant is designated as the presenter.

In block 305, the guidance system determines the participants of the collaborative session that has started and is ongoing. The guidance system, for example, being accessible and/or activated by the presenter of the collaborative session, queries the collaborative system for a list of participants in the collaborative session. Typically, a collaborative session, whether Web-based or a conference call conducted over conventional telephone lines, etc., is associated with a universal resource locator (URL). From the URL, users and/or other automated computer processes can determine or access information about the collaborative session, including the participants. In some cases, the collaborative system identifies the particular participant that is speaking at any given time.

In block 310, the guidance system determines one or more subject domains that are of interest to the participants. The guidance system, having a list of participants in the collaborative session, queries one or more interest sources to determine particular subject domain(s) of interest for one or more or each participant. In some cases, subject domains of interest, including expertise of a user, are explicitly listed within a profile, e.g., a company profile, a biography, a social media Website, and/or a blog of a participant. In other cases, NLP is applied to the interest sources to determine subject domains of interest when not explicitly stated.

For example, the guidance system determines interests of participants from the sources previously noted. The interests, as expressed in text obtained from the interest sources, are compared with a formal set of subject domains that can be expressed as a taxonomy, a list, a hierarchy, or other formal structured data specifying subject domains maintained within the guidance system. As such, from the text expressing interests for each participant, the guidance system determines or derives one or more subject domains of interest using a correlation or matching process. The guidance system, for example, the guidance system determines the subject domain(s) that match, or most closely match, the interests of participants, which can exclude those of the presenter.

After block 310, the guidance system has a list of the different subject domains of interest to participants of the collaborative session. In one aspect, interests of the presenter can be excluded from discovery and/or consideration. In any case, the guidance system has a list of subject domains of interest to participants, knows the number of participants and particular ones of the participants that are interested in each respective subject domain on the list for the collaborative session.

In block 315, the guidance system optionally determines the subject domain of the collaborative session. It should be appreciated that this determination is time specific as the particular subject domain discussed within the collaborative session can change at any given time. As such, the subject domain of the collaborative session is a "current" subject domain.

As discussed, in one aspect, the guidance system performs an analysis of audio via speech processing and applies NLP to the generated text. The NLP can be used to process text and, further, to correlate text derived from speech within the collaborative session with one or more subject domains from the formal set of subject domains maintained in the guidance system. As such, the subject domain(s) determined to match, or most closely match, the text is the current subject domain of the collaborative session.

In another example, the content of a digital artifact being shared, e.g., a file such as a presentation or word processing document, in the collaborative session can be evaluated using NLP. Such an artifact, for example, can be provided to the guidance system either directly from a communication device of the presenter or from the collaboration system upon request of the guidance system. Content, e.g., text from the artifact, can be compared with the formal set of subject domains to determine a matching, or most closely matching, subject domain as the current subject domain of the collaborative session.

In another aspect, while sharing an artifact within the collaborative session, the particular location within the artifact that is displayed or shared at a particular point in time is tracked as the collaborative session continues. In the case of a slide presentation, for example, the particular page of the slide being shown and/or the particular point or topic on the page (slide) can be determined by the guidance system. The presenter can provide input through his or her communication device (e.g., using a pointer or cursor) to navigate through the artifact, e.g., indicate page number, lines, and/or points currently discussed. This information can be provided to the collaborative system and obtained by the guidance system. In this regard, the current subject domain of the collaborative session can be correlated with a particular slide, point on the slide, line of text, etc., and, as such, can change and be updated as the collaborative session continues.

In block 320, the guidance system selects a subject domain. The selected subject domain is the one from which one or more words are selected and made available to the presenter in the form of word choice guidance. In one aspect, the guidance system selects the particular subject domain in which the largest number of participants has an interest.

In another aspect, the guidance system tracks which subject domains have been used to provide guidance during the collaborative session. In that case, the guidance system can select the particular subject domain in which the largest number of participants has an interest that has not yet been used as a source from which words are selected and provided to the presenter for the current collaborative session.

In another aspect, the guidance system, having also determined the current subject domain of the collaborative session, compares the current subject domain of the collaborative session with the subject domains determined in block 310. The guidance system selects the subject domain from those determined in block 310 that matches, or most closely matches, the current subject domain of the collaborative session. In illustration, the discussion taking place within the collaborative session may briefly move to one or more other and tangential topics that can be detected and used to determine a level of interest in such tangential topics. This allows the presenter to continue presenting materials and relate the subject matter of the presentation to such side or tangential topics determined to be of interest to participants.

In still another aspect, the guidance system determines the number of participants that have an interest in the current subject domain of the collaborative session. For example, a particular subset of the participants of the collaborative session may have an interest, e.g., an expertise, in the current subject domain of the collaborative session as determined from the interest sources. While participants, in general, may be considered to be interested in the collaborative session by virtue of attendance, having an interest, as used within this specification, refers to determining that a participant has an interest from an outside source, e.g., from the interest sources noted. Accordingly, the guidance system selects a subject domain from those determined in block 310 for which a largest number of participants of the subset of participants of the collaborative session has an interest.

In block 325, the guidance system selects one or more words from the selected subject domain. For example, the guidance system can include and/or access a list or corpus of text that is subdivided or structured according to subject domain. The word(s) can be selected from the corpus of text for the selected subject domain. Subject domain-specific words can include common phrases, expressions, action words, etc. for the selected subject domain.

In block 330, the guidance system determines whether the presenter is accepting guidance. In one aspect, the presenter, working through his or her communication client, can set a parameter indicating whether the presenter would like to receive word choice guidance. The parameter is communicated to the guidance system. Accordingly, when the guidance system determines that the presenter does want word choice guidance as indicated by the parameter, method 300 proceeds to block 335. When the guidance system determines that the presenter does not want word choice guidance, the selected word(s) are not provided to the presenter. In that case, method 300 continues to block 340.

In block 335, the guidance system provides the word(s) selected in block 325 to the presenter's communication device. The selected word(s) can be presented concurrently to the presenter with any material or artifacts for the collaborative session. The word(s) are not distributed, displayed, or otherwise made available, to non-presenter, participant of the collaborative session. In one aspect, the words can be placed or located on the display of the presenter in association with the particular items being discussed.

In block 340, the guidance system determines whether the collaborative session has ended. For example, the guidance system can receive a notification from the collaboration server, can query the collaboration server for a status, receive a notification from the communication device of the presenter, etc., indicating whether the collaborative session has ended. If the collaborative session has ended, method 300 ends. If not, method 300 loops back to block 305 to continue processing.

FIG. 3 illustrates a process that can be performed on a continuous basis (e.g., iterate), periodically, or responsive to particular events. Examples of events that can trigger or start the process described with reference to FIG. 3 include, but are not limited to, receiving a user input from the presenter requesting word choice guidance, participant(s) either joining or leaving the collaborative session, the particular artifact that is being shared changing state, e.g., a page turn or moving to a new bullet point on the same page, the sharing of a different artifact entirely, etc. In another aspect, the guidance system can continually monitor the subject domain of the collaborative session and select words as described responsive to determining that the subject domain has changed from a first subject domain to a second and different subject domain or from a first subject domain to a subject domain that is considered or classified as a sub-topic of the first subject domain.

Figure 4:
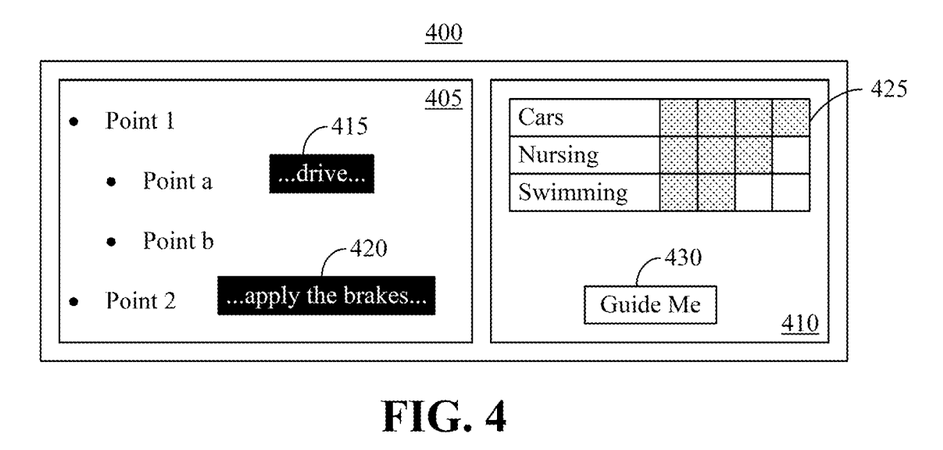
FIG. 4 is an exemplary view displayed upon a display of a communication device of a presenter during a collaborative session.

FIG. 4 is an exemplary view 400 as displayed upon a display of a communication device of a presenter during a collaborative session. View 400 includes a first window 405 and a second window 410. Window 405 shows content of an artifact that is being shared with, and as such, is viewable by, other participants in the collaborative session. The text "Point 1," "Point a," "Point b," and "Point 2" is part of the original artifact. In this example, the artifact is a slide show and one page, or slide, is in view by the presenter and the participants.

As illustrated, the guidance system, which has been engaged and is operational, is providing guidance for word choice illustrated as text blocks 415 and 420. Within each of text block 415 and 420, one or more words as selected by the guidance system from a selected subject domain are shown to the presenter. In this example, the particular words that are selected are shown in association with, e.g., next to, a particular point or portion of text of the artifact that is being shared. For example, text block 415 is next to "Point a" indicating that the presenter should use the word "drive" when speaking about point a. As an illustration, the presenter could state that "we need to drive <text of point a> through the roof!" Similarly, text box 420 is displayed in association with, e.g., next to, "Point 2." This indicates that the presenter should attempt to speak the text "apply the brakes" when discussing point 2. For example, the presenter can state "this <text of point 2> is becoming a problem and we need to apply the brakes."

As illustrated, the word choice guidance in the form of text blocks 415 and 420 is visually distinguished from the original content of the artifact that is being shared on the display viewed by the presenter.

Within window 410, the presenter is provided with an indicator 425, e.g., a list, specifying one or more subject domains of interest to participants of the collaborative session and an indication of the number of participants determined to have an interest in each respective subject domain. In this example, four participants (e.g., corresponding to four shaded blocks) have an interest in cars. Three participants have an interest in nursing. Two participants have an interest in swimming. Indicator 425 can be configured to present each subject domain of interest determined for the participants, the top "N" subject domains of interest in which "N" is an integer number, or the subject domains of interest with more than a minimum number of interested participants.

Window 410 illustrates that the guidance system can present any of a variety of information as determined and described herein to the presenter thereby allowing the presenter to utilize language from subject domains other than the subject domain selected. The presenter is told of the particular subject domains of interest to participants and provided with immediate means for holding the attention of the participants.

Within window 410, a "guide me" button or control 430 is shown. In one aspect, the presenter can select or activate control 430. Responsive to control 430, the communication device of the presenter can submit a request to the guidance system for word choice guidance. Accordingly, the guidance system can perform one or more steps as described herein and update indicator 425, provide one or more suggested words (e.g., text blocks 415 and 420), or perform both functions.

Figure 5:
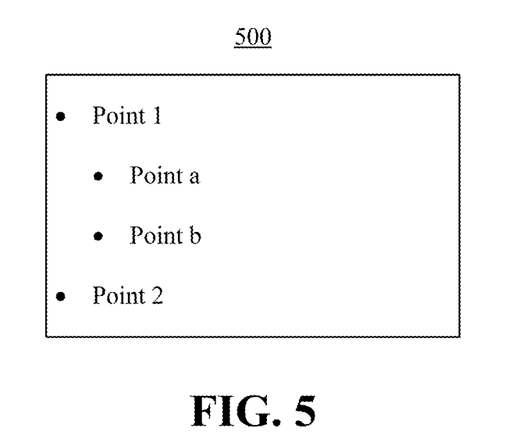
FIG. 5 is an exemplary view displayed upon a display of a communication device of a participant, non-presenter during a collaborative session.

FIG. 5 is an exemplary view 500 as displayed upon a display of a communication device of a participant, non-presenter. View 500 illustrates that each participant is able to see the same portion of the artifact as seen by the presenter illustrated in FIG. 4. One or more participants within the collaborative session have view 500 displayed upon the display of their communication device concurrently with the presenter having view 400 of FIG. 4 displayed upon the display of the presenter's communication device. As illustrated, however, the participants are not provided with suggested words, selected subject domains, etc.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "includes," "including," "comprises," and/or "comprising," when used in this specification, specify the presence of stated features, integers, steps, operations, elements, and/or components, but do not preclude the presence or addition of one or more other features, integers, steps, operations, elements, components, and/or groups thereof.

Reference throughout this specification to "one embodiment," "an embodiment," or similar language means that a particular feature, structure, or characteristic described in connection with the embodiment is included in at least one embodiment disclosed within this specification. Thus, appearances of the phrases "in one embodiment," "in an embodiment," and similar language throughout this specification may, but do not necessarily, all refer to the same embodiment.

The term "plurality," as used herein, is defined as two or more than two. The term "another," as used herein, is defined as at least a second or more. The term "coupled," as used herein, is defined as connected, whether directly without any intervening elements or indirectly with one or more intervening elements, unless otherwise indicated. Two elements also can be coupled mechanically, electrically, or communicatively linked through a communication channel, pathway, network, or system. The term "and/or" as used herein refers to and encompasses any and all possible combinations of one or more of the associated listed items. It will also be understood that, although the terms first, second, etc. may be used herein to describe various elements, these elements should not be limited by these terms, as these terms are only used to distinguish one element from another unless stated otherwise or the context indicates otherwise.

The term "if" may be construed to mean "when" or "upon" or "in response to determining" or "in response to detecting," depending on the context. Similarly, the phrase "if it is determined" or "if [a stated condition or event] is detected" may be construed to mean "upon determining" or "in response to determining" or "upon detecting [the stated condition or event]" or "in response to detecting [the stated condition or event]," depending on the context.

The corresponding structures, materials, acts, and equivalents of all means or step plus function elements in the claims below are intended to include any structure, material, or act for performing the function in combination with other claimed elements as specifically claimed. The description of the embodiments disclosed within this specification have been presented for purposes of illustration and description, but are not intended to be exhaustive or limited to the form disclosed. Many modifications and variations will be apparent to those of ordinary skill in the art without departing from the scope and spirit of the embodiments of the invention. The embodiments were chosen and described in order to best explain the principles of the invention and the practical application, and to enable others of ordinary skill in the art to understand the inventive arrangements for various embodiments with various modifications as are suited to the particular use contemplated.

What is claimed is:

1. A computer-implemented method within a collaboration system for providing suggested words to a presenting participant during an electronic communication session between the presenting participant and a plurality of non-presenting participants, comprising:

querying, by a guidance system of the collaboration system and over a computer network, one or more interest sources associated with the plurality of non-presenting participants to obtain subject domains of interest for the plurality of non-presenting participants;

real-time selecting, by the guidance system and from the subject domains of interest obtained via the querying, a word from a first subject domain of interest for a particular participant of the plurality of the non-presenting participants engaged in the electronic communication session; and forwarding, only to a communication device of the presenting participant during the electronic communication session, the word that is selected by the real-time selecting, wherein the querying is performed after initiation of the electronic communication session, and the collaboration system implements the communication session by facilitating communication between the communication device of the presenting participant concurrently with communication devices respectively associated with the plurality of non-presenting participants, includes a guidance system configured to query, over a computer network, one or more interest sources associated with the plurality of participants for subject domains of interest for the plurality of non-presenting participants from which the word is selected, and causes the word to be only displayed on the communication device of the presenting participant during the electronic communication session.

2. The method of claim 1, wherein
the first subject domain of interest is selected for the real-time selecting based upon a plurality of non-presenting participants indicating interest in the first subject domain of interest.

3. The method of claim 2, wherein
the first subject domain of interest is selected for the real-time selecting based upon a largest number of non-presenting participants indicating interest in the first subject domain of interest.

4. The method of claim 2, wherein
the first subject domain of interest is selected for the real-time selecting based upon the first subject domain of interest not being previously-selected, during the communication session, for the real-time selecting.

5. The method of claim 4, wherein
a plurality of real-time selecting and forwarding is performed by the guidance system during the communication session.

6. The method of claim 1, wherein
a current subject domain of the communication session is determined,
a subset of non-presenting participants having an interest in the current subject domain of the communication session is identified, and
the first subject domain of interest is selected for the real-time selecting based upon a largest number of the subset of non-presenting participants indicating interest in the first subject domain of interest.

7. The method of claim 1, wherein
a current subject domain of the communication session is determined, and
the first subject domain of interest is selected for the real-time selecting based upon the first subject domain of interesting matching the current subject domain.

8. A computer hardware system within a collaboration system for providing suggested words to a presenting participant during an electronic communication session between the presenting participant and a plurality of non-presenting participants, comprising:

a hardware processor programmed to initiate the following executable operations:

querying, by a guidance system of the collaboration system and over a computer network, one or more interest sources associated with the plurality of non-presenting participants to obtain subject domains of interest for the plurality of non-presenting participants;

real-time selecting, by the guidance system and from the subject domains of interest obtained via the querying, a word from a first subject domain of interest for a particular participant of the plurality of the non-presenting participants engaged in the electronic communication session; and forwarding, only to a communication device of the presenting participant during the electronic communication session, the word that is selected by the real-time selecting, wherein the querying is performed after initiation of the electronic communication session, and the collaboration system implements the communication session by facilitating communication between the communication device of the presenting participant concurrently with communication devices respectively associated with the plurality of non-presenting participants, includes a guidance system configured to query, over a computer network, one or more interest sources associated with the plurality of participants for subject domains of interest for the plurality of non-presenting participants from which the word is selected, and causes the word to be only displayed on the communication device of the presenting participant during the electronic communication session.

9. The system of claim 8, wherein
the first subject domain of interest is selected for the real-time selecting based upon a plurality of non-presenting participants indicating interest in the first subject domain of interest.

10. The system of claim 9, wherein
the first subject domain of interest is selected for the real-time selecting based upon a largest number of non-presenting participants indicating interest in the first subject domain of interest.

11. The system of claim 9, wherein
the first subject domain of interest is selected for the real-time selecting based upon the first subject domain of interest not being previously-selected, during the communication session, for the real-time selecting.

12. The system of claim 11, wherein
a plurality of real-time selecting and forwarding is performed by the guidance system during the communication session.

13. The system of claim 8, wherein
a current subject domain of the communication session is determined,
a subset of non-presenting participants having an interest in the current subject domain of the communication session is identified, and
the first subject domain of interest is selected for the real-time selecting based upon a largest number of the subset of non-presenting participants indicating interest in the first subject domain of interest.

14. The system of claim 8, wherein
a current subject domain of the communication session is determined, and
the first subject domain of interest is selected for the real-time selecting based upon the first subject domain of interesting matching the current subject domain.

15. A computer program product, comprising:
a computer hardware storage device having stored therein program code for providing suggested words to a presenting participant during an electronic communication session between the presenting participant and a plurality of non-presenting participants the program code, which when executed by a computer hardware system, causes the computer hardware system to perform:
  querying, by a guidance system of the collaboration system and over a computer network, one or more interest sources associated with the plurality of non-presenting participants to obtain subject domains of interest for the plurality of non-presenting participants;
  real-time selecting, by the guidance system and from the subject domains of interest obtained via the querying, a word from a first subject domain of interest for a particular participant of the plurality of the non-presenting participants engaged in the electronic communication session; and
  forwarding, only to a communication device of the presenting participant during the electronic communication session, the word that is selected by the real-time selecting, wherein the querying is performed after initiation of the electronic communication session, and
the collaboration system
  implements the communication session by facilitating communication between the communication device of the presenting participant concurrently with communication devices respectively associated with the plurality of non-presenting participants,
  includes a guidance system configured to query, over a computer network, one or more interest sources associated with the plurality of participants for subject domains of interest for the plurality of non-presenting participants from which the word is selected, and
  causes the word to be only displayed on the communication device of the presenting participant during the electronic communication session.

16. The computer program product of claim 15, wherein the first subject domain of interest is selected for the real-time selecting based upon a plurality of non-presenting participants indicating interest in the first subject domain of interest.

17. The computer program product of claim 16, wherein the first subject domain of interest is selected for the real-time selecting based upon a largest number of non-presenting participants indicating interest in the first subject domain of interest.

18. The computer program product of 16, wherein the first subject domain of interest is selected for the real-time selecting based upon the first subject domain of interest not being previously-selected, during the communication session, for the real-time selecting.

19. The computer program product of claim 18, wherein a plurality of real-time selecting and forwarding is performed by the guidance system during the communication session.

20. The computer program product of claim 15, wherein a current subject domain of the communication session is determined,
a subset of non-presenting participants having an interest in the current subject domain of the communication session is identified, and
the first subject domain of interest is selected for the real-time selecting based upon a largest number of the subset of non-presenting participants indicating interest in the first subject domain of interest.

* * * * *